United States Patent
Numajiri et al.

(10) Patent No.: US 7,112,925 B2
(45) Date of Patent: Sep. 26, 2006

(54) VEHICLE HEADLAMP SYSTEM AND DIMMING-TYPE VEHICLE HEADLAMP

(75) Inventors: Yasuyoshi Numajiri, Shizuoka (JP); Ken Kato, Shizuoka (JP); Shigeyoshi Yotoriyama, Shizuoka (JP); Kiyotaka Fukawa, Shizuoka (JP); Masao Okawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 34 days.

(21) Appl. No.: 10/797,110

(22) Filed: Mar. 11, 2004

(65) Prior Publication Data

US 2004/0178739 A1    Sep. 16, 2004

(30) Foreign Application Priority Data

Mar. 13, 2003    (JP)    ............ P.2003-067568

(51) Int. Cl.
*B60Q 1/02*    (2006.01)
(52) U.S. Cl. .................... 315/82; 362/465; 307/10.8
(58) Field of Classification Search ............... 315/82, 315/79, 80, 83; 362/41, 43, 464–467, 276, 362/802; 307/10.8, 10.1
See application file for complete search history.

(56) References Cited

U.S. PATENT DOCUMENTS

| 5,567,032 A * | 10/1996 | Heizmann ............... 362/466 |
| 5,975,730 A * | 11/1999 | Neumann et al. ........ 362/517 |
| 6,176,590 B1 * | 1/2001 | Prevost et al. .......... 362/464 |
| 6,255,639 B1 * | 7/2001 | Stam et al. .............. 315/82 |
| 6,293,686 B1 * | 9/2001 | Hayami et al. .......... 315/82 |
| 2001/0028565 A1 * | 10/2001 | Ishida ..................... 315/81 |

FOREIGN PATENT DOCUMENTS

| EP | 1129899 A | * | 9/2001 |
| JP | 2-17364 Y2 | | 5/1990 |
| JP | 11-45606 A | | 2/1999 |
| JP | 2000-177480 A | | 6/2000 |
| JP | 2001-213227 A | | 8/2001 |
| JP | 2001-270383 A | | 10/2001 |
| JP | 2002-225623 A | | 8/2002 |
| JP | 2002-225624 A | | 8/2002 |
| JP | 2003-159986 A | | 6/2003 |

* cited by examiner

*Primary Examiner*—Tuyet Vo
*Assistant Examiner*—Ephrem Alemu
(74) *Attorney, Agent, or Firm*—Sughrue Mion, PLLC

(57) ABSTRACT

Lamp units for radiating a beam ahead of a vehicle in a light distribution pattern are housed in a lamp body. Illumination of the auxiliary lamp units is controlled based on driving conditions. Illumination control means extinguish light through dimming by gradually decreasing voltage applied to the light sources. When the applied voltage has dropped to a threshold value, the applied voltage is controlled to zero immediately. Compared to when the lamps remaining in an illuminated state are suddenly extinguished, a change in quantity of light is mild, and no uncertainty arises. Below a threshold value where the applied voltage gradually drops to the threshold value and a change may arise in the filament crystalline structure due to annealing at a transition temperature, the applied voltage approaches zero. Hence, the filament does not pass from the transition temperature while being rapidly cooled, thus avoiding filament crystalline structure change.

15 Claims, 13 Drawing Sheets

FIG. 9

| LIGHTING REQUIREMENT | | | AVERAGE | MAX | MIN | DEFORMATION OF FILAMENT |
|---|---|---|---|---|---|---|
| CONTINOUS ILLUMINATION | | | 619.6 | 878.8 | 287.6 | NONE |
| BLINKING | (a) NO DIMMING | | 470.1 | 559.5 | 400.4 | NONE |
| | (b) DIMMING DURING EXTINCTION | 2sec. | 41.6 | 50.4 | 33.2 | DEFORMED |
| | | 1sec. | 274.8 | 490.1 | 114.7 | DEFORMED |
| | | 0.5sec. | 420.2 | 679.2 | 298.8 | DEFORMED |
| | (d) STOPWISE DIMMING | | 486.6 | 638.5 | 393.3 | NONE |
| | (c) VOLTAGE SWITCHING | 14/6V | 254.3 | 499.0 | 79.6 | DEFORMED |
| | | 14/7V | 38.9 | 49.9 | 26.7 | DEFORMED |
| | | 14/8V | 18.9 | 25.7 | 6.2 | DEFORMED |
| | | 14/9V | 62.6 | 116.6 | 24.1 | DEFORMED |
| | | 14/9.5V | 250.0 | 280.0 | 138.9 | SLIGHTLY DEFORMED |
| | | 14/10V | 514.5 | 667.0 | 308.5 | NONE AT THIS TIME |

VEHICLE HEADLAMP SYSTEM AND DIMMING-TYPE VEHICLE HEADLAMP

The present application claims foreign priority from Japanese Patent Application No. 2003-067568, filed Mar. 13, 2003, the contents of which are incorporated herein by reference.

BACKGROUND OF THE INVENTION

1. Technical Field

The present invention relates to a multiple-light-type vehicle headlamp system including a headlamp, the headlamp being constructed of a plurality of lamp units housed in a lamp chamber, or a headlamp formed from one or more lamp units housed in a lamp chamber as well as from an auxiliary lamp disposed in the vicinity of the headlamp. More specifically, the present invention relates to a vehicle headlamp system constructed such that the quantity of light emitted ahead of a vehicle is controlled by subjecting the quantity of light radiated from at least one lamp unit to dimming control in the former case in accordance with the driving conditions, or by subjecting the quantity of light radiated from at least one lamp unit and/or the auxiliary lamp to dimming control in the latter case in accordance with the driving conditions.

2. Background of the Related Art

In the related art, a vehicle headlamp system is constructed to enable selective switching between a low-beam light distribution pattern and a high-beam light distribution pattern. The related art vehicle headlamp system having a fixed configuration of the respective low and high light distribution patterns encounters difficulty in emitting a beam in an appropriate light distribution pattern in accordance with driving conditions.

For this reason, as described in, Japanese publication JP-UM-A-2-17364, the contents of which is incorporated herein by reference, a proposed vehicle headlamp system emits a beam in a light distribution pattern corresponding to the driving conditions, by causing lamp units to illuminate in an appropriate combination corresponding to the driving conditions. In this related art system, a lamp body houses multiple lamp units that emit light beams ahead of a vehicle in a predetermined light distribution pattern.

Moreover, Japanese publication JP-A-11-45606, the contents of which is incorporated herein by reference, discloses a proposed related art vehicle headlamp system that enables an increase or decrease in the quantity of light radiated from the respective lamp units housed in the lamp body through the driver's manual operation.

However, in the foregoing related art vehicle headlamp system, some of the lamp units are extinguished or re-illuminated in accordance with the driving conditions. Therefore, there arises a problem of the chance of the driver feeling uncertainty due to a sudden drop in the driver's view field, or the chance of drivers of oncoming vehicles or pedestrians feeling uncertainty (e.g., a false recognition of occurrence of passing operation). For example, but not by way of limitation, when the vehicle is viewed from the outside, some of the lamp units are suddenly extinguished and be come partially dark. Therefore, there also arises a problem of poor appearance of the lamp.

As shown in Japanese publication JP-A-2001-270383, the contents of which is incorporated herein by reference, a solution to "the driver of interest, drivers of oncoming vehicles, and pedestrians feeling uncertainty" and a "a partial drop in the internal light of the lamp body deteriorating the appearance of the lamp" is proposed by configuring a vehicle headlamp system so that the quantity of light of at least some of the plurality of lamp units housed in the lamp body can be adjusted by dimming means and, in accordance with the driving conditions (e.g., the amount of rotation of a steering wheel as detected by a steering angle sensor), a control unit automatically drives the dimming means, to increase or decrease the quantity of light radiated from a predetermined lamp unit.

However, in the foregoing related art technique, the headlamp system performs dimming control such that the auxiliary lamp unit gradually shifts from a steady illuminated state to an extinguished state by housing, in a lamp body, an auxiliary lamp unit, such as a bend lamp or a cornering lamp, along with a high beam lamp unit and a low beam lamp unit, and gradually decreasing the amount of power (an effective value of an applied voltage, hereinafter called an "applied voltage") fed to a light source (a halogen valve) of the auxiliary lamp unit in accordance with the driving conditions (e.g., the amount of rotation of a steering wheel). However, such a configuration induces a related art problem of deformation of a filament of the valve (i.e., the halogen valve) of the auxiliary lamp unit to be dimmed, thereby shortening the life of the valve.

To determine, the cause of this related art problem, an H8 valve (having a normal rated power of 12 volts and 35 watts) was subjected to a continuous illumination test, a blinking test (simple blinking, dimming performed at the time of extinction), and a voltage switching illumination test. Results such as those shown in FIGS. 9 and 10 were obtained.

Further, as shown in FIG. 11A, in the simple blinking test in which feeding power to the valve and suspension of power feed were alternately performed at intervals of five seconds (a voltage of 14 volts and a voltage of 0 voltage were applied to the filament of the valve at intervals of five seconds), the life of the valve (a feeding time accumulated until a rupture occurs) dropped slightly as shown in FIGS. 9 and 10 ($a$). However, for continuous illumination in which a given voltage (14 volts) is continuously applied to the valve, no deformation in the filament was observed.

As shown in FIG. 11B, in the blinking test (a dimming operation performed at the time of extinction) in which feeding power to the filament and suspension of power feed were alternately performed at intervals of five seconds to gradually decrease the amount of power (applied voltage) over a period of about two seconds (one second or 0.5 seconds) during suspension of power feed, thereby shifting the valve to an extinguished state, the filament was deformed as shown in FIGS. 9 and 10 ($b$). The life of the valve was shortened. Particularly, the lower the dimming speed (i.e., the longer the filament is cooled), the greater the deformation of the filament, and the shorter the life of the valve.

As shown in FIG. 11C, in the voltage switching illumination test in which alternating power supply was fed to the valve such that the voltage applied to the valve was switched between 14 volts and 6 (7, 8, 9, 9.5, and 10) volts at intervals of five seconds, when alternating power supply involving a minimum applied voltage of 6 volts (7 volts, 8 volts, 9 volts or 9.5 volts) was fed as shown in FIGS. 9 and 10C, the filament was deformed. In contrast, when the alternating power (14 volts/10 volts) involving a minimum applied voltage of 10 volts was fed, no substantial deformation in the filament was observed.

Deformation of the filament (i.e., the degree of deformation, a time which lapses until deformation arises, and influence on the life time of the valve) became increasingly severe as the minimum applied voltage increased in a sequence of: 6 volts, 7 volts, 8 volts. Particularly, for the minimum applied voltage of 8 volts, the deformation was considerable.

When the minimum applied voltage was increased in the sequence of: 8 volts, 9 volts, 9.5 volts, the degree of deformation became weak, and the life of the valve was prolonged. Here, the accumulated time during which 14 volts had been supplied was taken as the life of the voltage switching illumination test.

Since difficulty is encountered in directly measuring the temperature of the filament that is achieved at the time of illumination of the valve, a radiant intensity of infrared rays of the illuminating filament was determined as a temperature distribution of the filament. Results shown in FIG. 12 were obtained FIG. 12A shows measurement points P1 to P18 on the filament. FIG. 12B shows the temperature distribution of the filament achieved with applied voltages 6, 8, 10, 12, 14, and 16, while the radiant intensity of infrared rays achieved at an applied voltage of 14 volts was taken as 100%. The highest temperature is achieved at the longitudinal center of the filament, and the temperature decreases toward ends of the filament.

FIGS. 13A and 13B show variations in the temperature of the filament achieved during the simple blinking test, the blinking (light is dimmed at the time of extinction) test, the blinking (light is dimmed to a threshold value at the time of extinction) test, and the voltage switching illumination test. FIG. 13A shows variations in temperature of filament having arisen after simple blinking, blinking (dimming during extinction), blinking (dimmed to threshold value during extinction as in embodiment). FIG. 13B shows variations in temperature of filament having arisen after simple blinking and voltage switching.

As shown in FIG. 13A, according to the blinking test (dimming performed for extinction) the longer the dimming time (0.5 seconds→one second→two seconds), the more slowly the filament is cooled. In the voltage switching illumination test in FIG. 13B, the cooling speed of the filament achieved immediately after switching from the maximum applied voltage to the minimum voltage is fast. However, the temperature of the filament slowly, gradually approaches the temperature to be achieved by the minimum applied voltage (i.e., the cooling speed of the filament is reduced).

In the blinking (light is dimmed at the time of extinction) test (see FIGS. 9, 10, 11, and 13B), the state of deformation of the filament was captured by a camera, and deforming motions were examined. As shown in FIGS. 14A and 14B, the filament axially expanded and contracted and vibrated every time the valve was illuminated. Some of the adjacent coil sections contacted each other, thereby causing pitch touch. Specifically, both end sections of the filament are fixedly fused to, e.g., a lead support.

Due to electromagnetic force generated by a rush current flowing during illumination of the valve and the thermal stress caused by a temperature variation, the filament axially expanded and contracted (i.e., vibrated) and was subjected to repetition of axial expansion and contraction, thereby resulting in deformation. One possible reason for this effect is that the mechanical strength of a portion of the filament has become weak: that apart of the filament having low strength is deformed by expansion and contraction of the coil and that coil sections c1, c1 adjoining to the deformed area come into contact with each other, thereby causing pitch touch and rupture.

From the foregoing test results, the applicant has made the following determinations. The filament is made of high purity tungsten. From room temperature to a high temperature, the basic crystalline structure of tungsten is a body-centered cubic lattice. Tungsten is not known to have-any definite transition point (or transition temperature) at which the crystalline structure changes. However, the test results become understandable if a transition point (transition temperature) at which a change arises in the crystalline structure of a tungsten filament roughly corresponds to a light source applied voltage of 8 volts (i.e., the temperature of the filament achieved when a voltage of 8 volts is applied to the valve).

More specifically, every time a dimming control operation is performed for shifting the valve to an extinguished state by gradually decreasing the amount of power fed to the valve (i.e., the voltage applied to the light source) during illumination, the tungsten filament is gradually cooled from a temperature higher than the transition point (the transition temperature). Every time the filament is cooled, the transition point (transition temperature) unique to the filament tungsten is gradually passed. If the transition point (transition temperature) is repeatedly passed in association with dimming control operation while tungsten is gradually cooled, the crystalline structure of tungsten is changed to a structure readily deformed by stress (i.e., the transition distribution in a crystal is changed) achieved at the time of annealing of the crystalline structure of tungsten. Consequently, the filament is presumed to be deformed by the electromagnetic force or thermal stress caused during illumination of the valve.

As shown in FIGS. 9, 10, and 13B, the influence of "annealing achieved at the transition point (transition temperature)" is significant when a dimming speed (a cooling speed of the filament) is slow. As shown in FIGS. 9, 10, and 13A, in the simple blinking test not involving a dimming operation, the speed at which the filament is annealed is rapid. Hence, the filament is considered less susceptible to the influence of "annealing achieved at the transition point (transition temperature)" (i.e., the influence on the crystalline structure).

The voltage switching illumination test involving application of alternating power supply was conducted for examining alight source applied voltage corresponding to the transition point (transition temperature). As shown in FIGS. 9 and 10 (c), when the minimum applied voltage is 7 to 8 volts, shortening of the valve life (≈a deformation of the filament) is considerable. The filament of this case is affected by the annealing operation achieved at the transition point (transition temperature) during the course of the filament shifting from a high-temperature state in which a high heating value is obtained as a result of application of a voltage of 14 volts, to a low-temperature state in which a low heating value is obtained as a result of application of the minimum voltage (during the course of the applied voltage being changed).

Specifically, the cooling speed of the filament achieved immediately after the applied voltage has been switched from 14 volts to 7 to 8 volts is fast. However, after a while, the temperature of the filament slowly approaches the temperature corresponding to the heating value achieved at the applied voltage of 7 to 8 volts. At this time, the transition point is passed slowly, whereupon the filament is affected by the annealing operation achieved at the transition point (transition temperature).

Even if the transition point (transition temperature) is situated in the vicinity of the light source applied voltage of about 8 volts, the temperature distribution of the filament is such that the ends and the center of the filament show a difference of 200° C. As a matter of course, when an alternating power supply involving a minimum applied voltage of 7 or 9 volts (14 volts/7 volts or 14 volts/9 volts) is applied to the filament, the filament is slightly affected by the "annealing operation achieved at the transition point (transition temperature)." This result also applies when an alternating power supply involving a minimum applied voltage of 6 and 9.5 volts (14 volts/6 volts or 14 volts/9.5 volts) is applied to the filament.

When an alternating power supply involving a minimum applied voltage of 6 volts (14 volts/6 volts) is applied to the filament, the cooling speed of the filament (i.e., a temperature variation) achieved when the transition point (transition temperature) is passed is considerably fast. Therefore, when compared with a case where the alternating power supply (14 volts/7 volts) is applied to the filament, the extent to which the filament is affected by the annealing operation achieved at the transition point (transition temperature) is smaller. When the alternating power supply involving a minimum applied voltage of 10 volts (14 volts/10 volts) is applied to the filament, the entire filament fails to reach the transition point (transition temperature), and hence the filament is considered not affected by the annealing operation achieved at the transition point (transition temperature).

As mentioned above, on the premise that the transition point (transition temperature) of a filament made of tungsten is present within the valve applied voltage range from 7 to 8 volts (the temperature range of the filament achieved when a voltage of 7 to 8 volts is applied to the valve), applicant has considered that the filament would not be affected by the annealing operation achieved at the transition point (transition temperature) within the range of a light source applied voltage of 14 to 9 volts at which the transition point (transition temperature) is not achieved even when dimming control operation is performed to gradually decrease the light source applied voltage, and that the filament would not be affected by the annealing operation achieved at the transition point (transition temperature) within the range of a light source applied voltage of 9 volts or less at which the transition point (transition temperature) is passed, so long as the filament is rapidly cooled by means of decreasing the light source applied voltage to 0 in one stroke (i.e., substantially instantaneously), as discovered by applicant.

As shown in FIG. 11D, there was adopted, as dimming control for extinguishing light by gradually decreasing the amount of power supplied to the valve (i.e., the light source applied voltage), a configuration for controlling the light source applied voltage to 0 in one stroke when a predetermined threshold value (e.g., 9 volts) is achieved by means of gradually decreasing the light source applied voltage from 14 volts to the predetermined threshold value (9 volts) at which the transition point is not achieved, over a period of one to two seconds. Through repetition of the blinking test (dimming performed at the time of extinction), prevention of deformation of the filament is ascertained to be effective. The presently claimed invention has been proposed on the basis of this concept.

SUMMARY OF THE INVENTION

In view of at least the foregoing drawbacks of the related art, the present invention has been conceived on the basis of the findings described by the inventor. While the following objects are listed, it is noted that the present invention need not satisfy these objects, or any other objects.

A first object of the invention is to provide a vehicle headlamp system which prevents shortening of the life of light sources of lamp units subjected to a dimming control operation when the quantity of light radiated from at least one of a plurality of lamp units housed in a lamp body is subjected to dimming control in accordance with the driving conditions.

A second object of the invention is to provide a vehicle headlamp system which comprises a headlamp having one or more lamp units housed in a lamp body, and an auxiliary lamp disposed in the vicinity of the head lamp and which prevents shortening of the life of the lamp unit subjected to dimming control and shortening of the life of the light source of the auxiliary lamp when the quantity of light radiated from at least one of a plurality of lamp units and/or the quantity of light radiated from the auxiliary lamp are subjected to dimming control in accordance with the driving conditions.

Thus, a vehicle headlamp system is provided that is equipped with a head lamp and configured to control illumination of lamp units in accordance with the driving conditions, the headlamp comprising a plurality of lamp units which are housed in a lamp chamber defined by a lamp body, and a front lens and emitting a beam ahead of the vehicle in a light distribution pattern, the headlamp system comprising dimming control means, serving as the illumination control means, which increases or decreases the amount of power fed to a light source of at least one of the plurality of the lamp units in order to increase or decrease the quantity of light radiated from the lamp unit, wherein the dimming control means gradually decreases an effective value of a light source applied voltage, to thereby extinguish the lamp unit, but controls the effective value of the applied voltage to zero in one stroke when the effective value of the applied voltage has decreased to a threshold value.

Also, a vehicle headlamp system is provided that is equipped with a headlamp and an auxiliary lamp and configured to control illumination of one or more lamp units and/or illumination of an auxiliary lamp in accordance with the driving conditions, the headlamp comprising one or more lamp units housed in a lamp chamber defined by a lamp body, and a front lens and emitting a beam ahead of the vehicle in a light distribution pattern. The auxiliary lamp is disposed in the vicinity of the headlamp and emitting a beam ahead of the vehicle in a light distribution pattern, and the headlamp system includes dimming control means, serving as the illumination control means, which increases or decreases the amount of power fed to a light source of at least one of the plurality of the lamp units, and/or the amount of power fed to a light source of the auxiliary lamp, to increase or decrease the quantity of light radiated from the lamp unit and/or the quantity of light radiated from the auxiliary lamp unit, both being provided in the head lamp, wherein the dimming control means gradually decreases an effective value of a light source applied voltage, to thereby extinguish the lamp unit and/or the auxiliary lamp, but controls the effective value of the applied voltage to zero in one stroke when the effective value of the applied voltage has decreased to a threshold value.

The above-disclosed "lamp units", and "lamp unit" and the "auxiliary lamp unit," are not limited to any specific configurations. The lamp units may be a so-called parabolic or projector-type lamp unit. Moreover, the light sources of the respective "lamp units" and the light source of the "auxiliary lamp" are not limited to any specific configurations. The light sources may be a light discharge emitting section of a discharge valve or a filament or the like of an incandescent valve, such as a halogen valve. However, the "lamp unit" and the "auxiliary lamp" subjected to dimming control are intended primarily for providing auxiliary illumination. In view of space and costs, the light source is desirably an incandescent valve having a filament.

The "light distribution patterns" formed from the respective "lamp units" and the "auxiliary lamp" may be light distribution patterns of different shapes, or light distribution patterns of identical shape.

Dimming control of the "lamp unit" and the "auxiliary lamp" can be performed by means of selecting various indicators representing the driving conditions, such as a vehicle speed, a steering angle, a turn signal operation signal, traffic communication information, navigation information, or the like, as required.

The lamp unit to be subjected to dimming and extinction control (corresponding to the lamp unit and/or auxiliary lamp) gradually decreases the quantity of light radiated from a normal illuminated state. When the quantity of light has decreased to a certain quantity of light, the light is extinguished. Hence, when compared with a case where the light is suddenly extinguished from a normal illuminated state, variation in the quantity of light is mild and does not induce any sudden change.

At the time of extinction, the effective value of a light source applied voltage is gradually decreased to a "threshold value" [a descending limit value of an effective value of a light source applied voltage which is set such that the crystalline structure of a filament does not reach a transition point (a transition temperature) when the effective value of the light source applied voltage is gradually decreased from a rated voltage]. During the course of lowering of the effective value, the temperature of the filament does not reach the transition temperature. Therefore, the crystalline structure of the filament does not change (does not change to a structure which is easily deformed by stress). Here, the transition point (transition temperature) is a temperature at which the crystalline structure of tungsten changes to a "structure which is easily deformed by stress" (i.e., a dislocation distribution in a crystal changes) as in a case where the crystalline structure of tungsten is "annealed" when a filament made of tungsten is gradually cooled from a high temperature.

When the effective value of the light source applied voltage is equal to or less than the "threshold value," the filament is annealed at the transition point (transition temperature) of the filament, whereby the crystalline structure of the filament may change. When the effective value of the light source applied voltage has reached the "threshold value," the effective value of the voltage applied to the light source becomes zero in one stroke. Therefore, the temperature of the filament passes through the transition point while the filament is being rapidly cooled and reaches a low temperature falling outside the transition point (transition temperature). For this reason, the filament is not subjected to the influence of "annealing operation achieved at the transition point (transition temperature)" [i.e., the influence of a change in a crystalline structure].

Additionally, in accordance with the above described vehicle head lamp systems, the dimming control decreases the effective value of the voltage applied to the light source to a threshold value over a period of about one to two seconds.

When the dimming control time, during which the effective value of the light source applied voltage is gradually decreased to a "threshold value", is less than about one second, extinction of the light is close to momentary extinction, which poses uncertainty to the driver of interest, passengers and drivers of oncoming vehicles, and pedestrians. In contrast, when the dimming control time exceeds about two seconds, the time that elapses before extinction is too long, which results in a failure to obtain the quantity of light which the driver considers to correspond to the driving conditions (i.e., the quantity of light is poor in terms of following the driving conditions). Therefore, the dimming control time during which the quantity of light is gradually reduced is preferably set within the range from about one to two seconds, at which the driver considers the quantity of light to correspond to the driving conditions, and no uncertainty is posed to the driver of interest, passengers and drivers of oncoming vehicles, and pedestrians.

Additionally, in accordance with the above described vehicle head lamp systems, the threshold value of the effective value of the light source applied voltage is a value falling within a range of about 7 volts to about 9 volts.

The transition point (transition temperature) of a filament made of tungsten in an H8 valve is presumed, by experiment, to correspond to an effective value of about 8 volts of the light source applied voltage. Therefore, the range in which the quantity of light subjected to dimming control can be broadened (i.e., a difference between the quantity of light achieved by momentary extinction and that achieved by illumination can be reduced), so long as the "threshold value" of the effective value of the light source applied voltage is set as close as possible to a value (about eight volts) corresponding to the transition point (transition temperature). Such broadening of the range is preferably in terms of prevention of uncertainty, which would otherwise be caused during extinction.

However, the heating value (temperature) of the filament changes according to the type of valve. Hence, variations exist in the transition point (transition temperature). The temperature distribution of the filament in the illumination valve is not constant longitudinally; rather, the temperature is high in the center of the filament and lower at both ends of the same. The effective value (about 14 volts) of the light source applied voltage used in the illumination test that was performed is higher than the effective value (about 13.0 volts) of the light source applied voltage achieved when the lamp is actually used. Further, the blinking frequency of the lamp is also high. Thus, the effective value is too rigorous to satisfy practical requirements. In consideration of the foregoing points, the "threshold value" of the effective value of the light source applied voltage is set to a value (e.g., about 9 volts) falling within the range of about 7 volts to about 9 volts, so that the life of the valve required in an actual operating state of the lamp can be ensured without fail.

To set the "threshold value" of the effective value of the light source applied voltage, a voltages witching illumination test is performed to accurately ascertain an applied voltage corresponding to the transition point (transition temperature). If the applied voltage has nominally exceeded the applied voltage, the degree of uncertainty, which would arise at final extinction of the lamp, will be preferably reduced. However, when the applied voltage approaches the effective value of the light source applied voltage corresponding to the transition point (transition temperature), the filament may be correspondingly affected by the influence of "annealing operation achieved at the transition point (transition temperature)" (i.e., an influence on a crystalline structure). Hence, the threshold value is desirably set in consideration of the uncertainty, which would arise at the time of final extinction, and safety for the required life of the valve.

Additionally, in accordance with the above described vehicle head lamp systems, dimming control performed by the dimming control means at the time of extinction is configured to lower the effective value of the light source applied voltage to a threshold value along the locus of a convex-shaped continuous hyperbola.

When dimming control has been performed through PWM (pulse width modulation) based on both a preset time and table data pertaining to a light source applied voltage, a duty ratio of PWM (i.e., a ratio of an ON time) may be linearly decreased from about 100% through duty control based on a time/applied voltage characteristic pattern in which the effective value of the applied voltage decreases with time. However, if the effective value of the light source applied voltage is controlled so as to decrease along the locus of an upwardly-convex-shaped hyperbola, the degree of decrease in the quantity of light will become larger as the effective value approaches the threshold value, thereby diminishing uncertainty which would arise when about 0 volt is achieved after the threshold value has been reached.

Additionally, in accordance with the above described vehicle head lamp systems, the lamp unit and/or auxiliary lamp, which are subjected to the dimming control operation, are configured to be illuminated and extinguished in conjunction with a switching operation; wherein, when illumination of an environment is equal to or higher than a value, power is not fed to the light source of the lamp unit and/or the light source of the auxiliary lamp even when the switching operation is performed; and wherein, when illumination of the environment has increased to a value or more during illumination of the lamp unit and/or the auxiliary lamp, the effective value of the voltage applied to the light source of the lamp unit and/or the effective value of the voltage applied to the light source of the auxiliary lamp are controlled to zero in one stroke.

A driver encounters difficulty in driving a vehicle in a dark environment as found in the rain, at night, or in a tunnel. On the contrary, driving a vehicle in daylight under a clear sky is easy, because of a bright environment. As such, the brightness of the environment in which the vehicle is situated is called "environment illumination." For example, but not by way of limitation, the "environment illumination" can be measured by means of a light quantity sensor disposed on top of a dashboard facing the windshield.

When the quantity of light (environment illumination) measured by the light quantity sensor is equal to or higher than a value, the quantity of light radiated a head of the vehicle does not need to be increased. Therefore, even when switching operation is performed for causing the lamp unit and/or the auxiliary lamp to illuminate, the lamp unit and/or the lamp do not need to be illuminated. In contrast, when the quantity of light (environment illumination) measured by the light quantity sensor has exceeded a value during illumination of the lamp unit and/or the auxiliary lamp, an increase in the quantity of light radiated ahead of the vehicle does not need to be made continuous. For at least these reasons the lamp A unit and/or the auxiliary lamp, which are being illuminated, are extinguished in one stroke.

Particularly, there has already been known an automatic lighting system having a light quantity sensor (e.g., an environment illumination detection sensor) mounted on an upper surface of a dashboard facing the windshield, wherein a sub-beam formation lamp unit of a headlamp is automatically controlled to illuminate or go out in accordance with a signal (output) from the light quantity sensor. The lamp unit and/or the auxiliary lamp can also be automatically extinguished through use of the signal output from the light quantity sensor (the environment illumination detection sensor).

BRIEF-DESCRIPTION OF THE DRAWINGS

Figure 10:
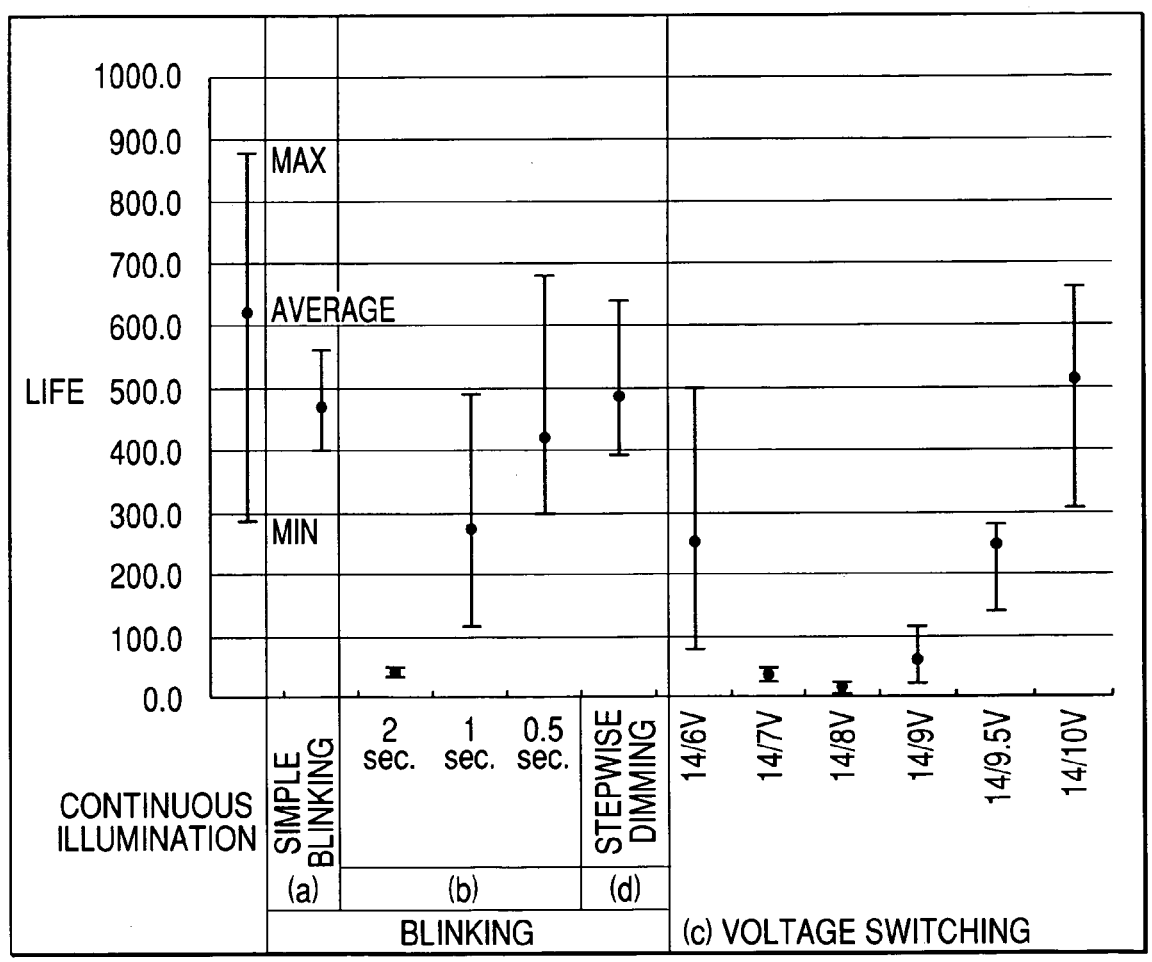
Figure 11A:
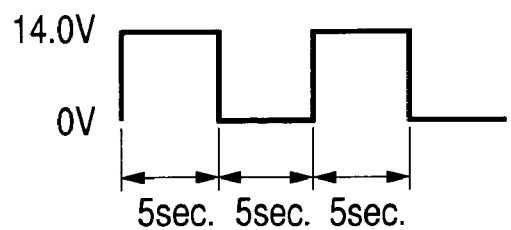
Figure 11B:
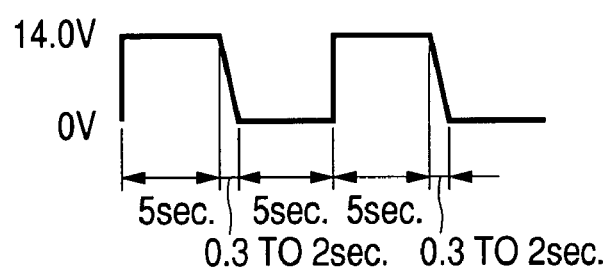
Figure 11C:
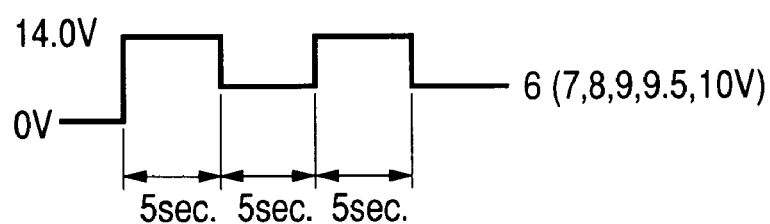
Figure 11D:
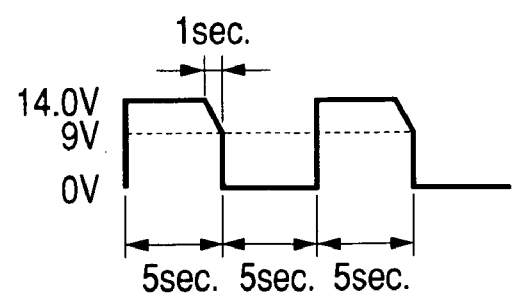
Figure 12A:
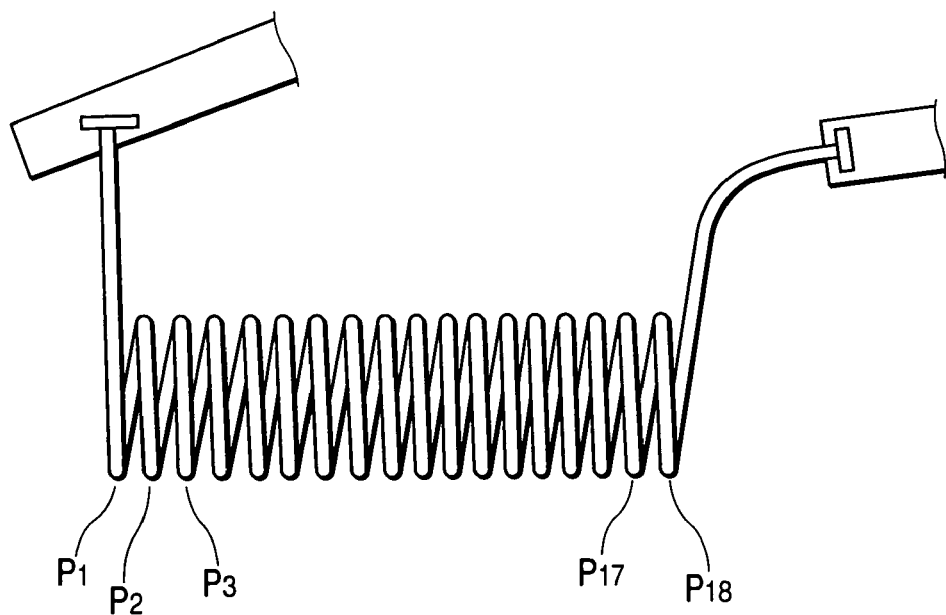
Figure 12B:
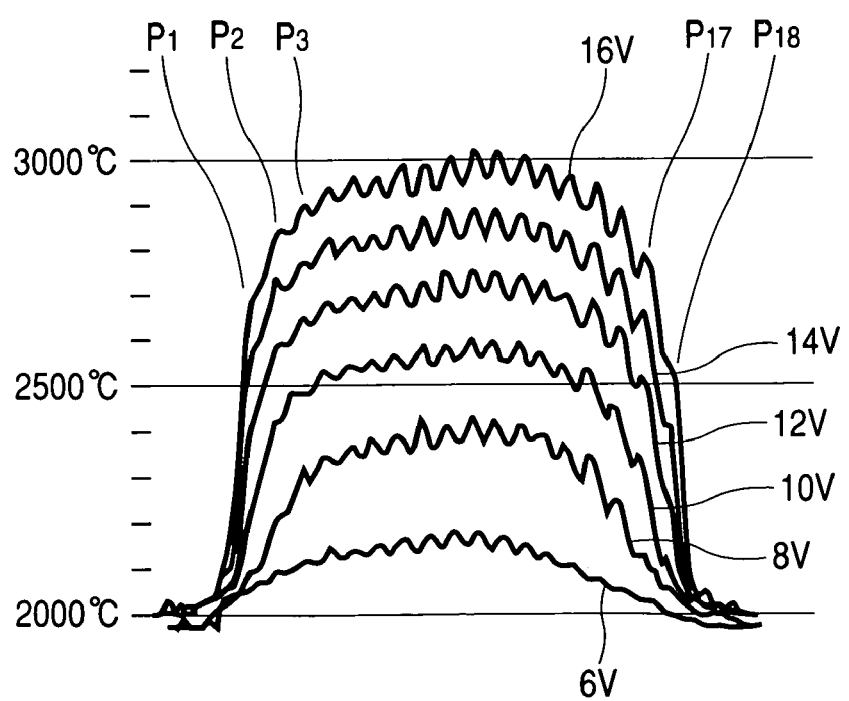
Figure 13A:
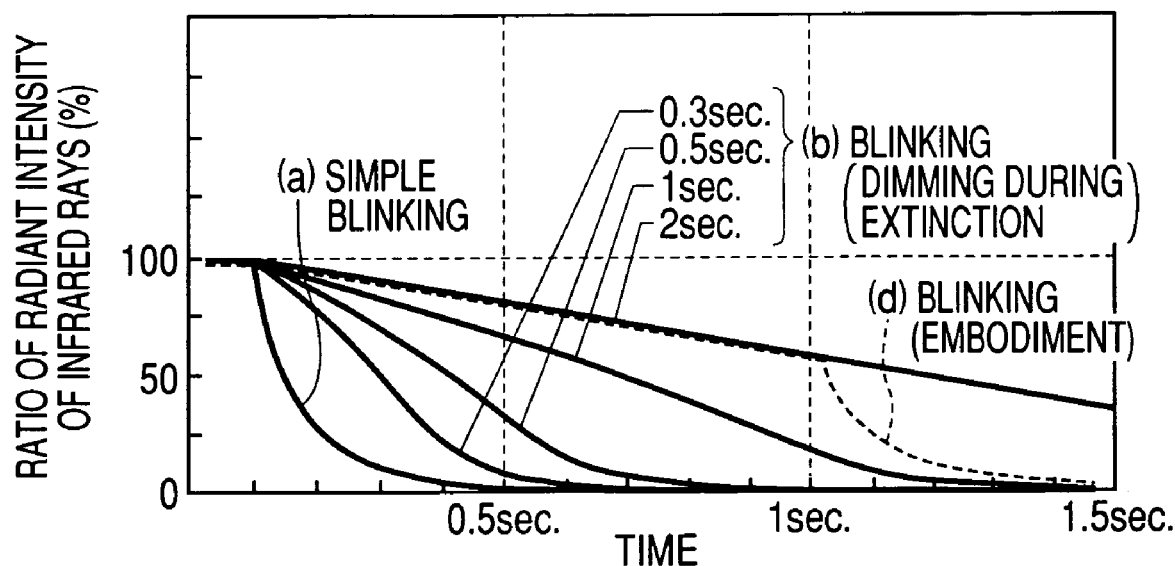
Figure 13B:
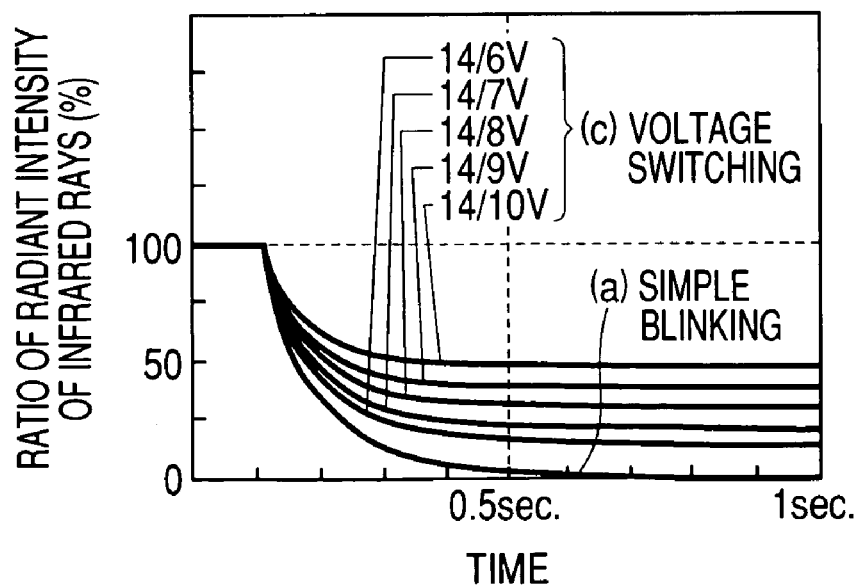
Figure 14A:
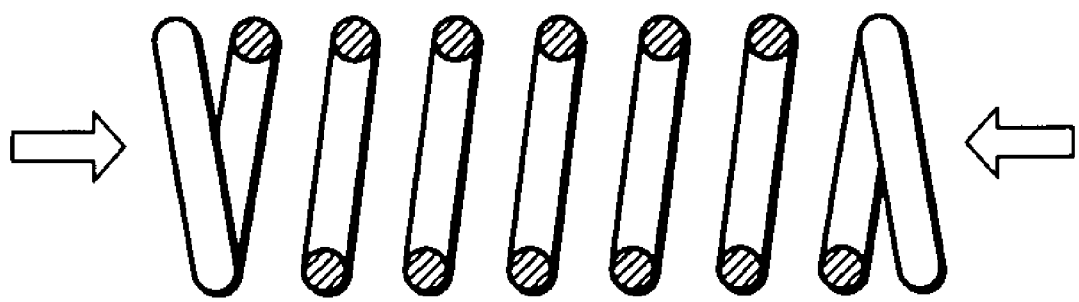
Figure 14B:
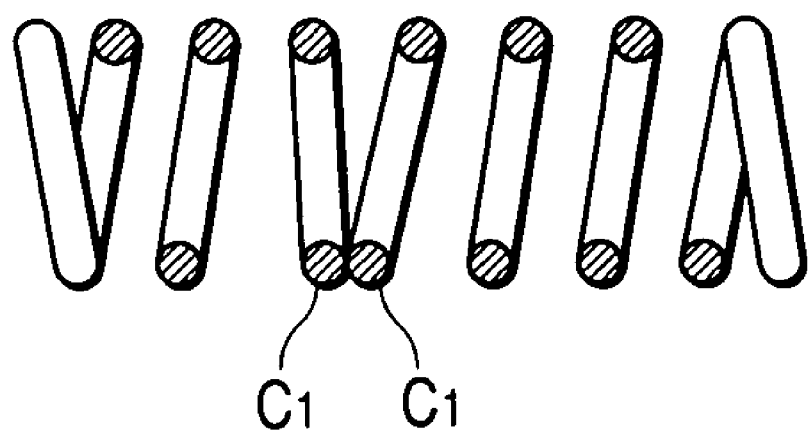

FIG. 9 is a view showing deformation of a filament of a valve having arisen through continuous illumination, simple blinking, blinking [dimming performed at the time of extinction (a dimming time of 2 seconds, 1 second, and 0.5 seconds)], blinking (as in an exemplary, non-limiting embodiment in which light is dimmed to a threshold value at the time of extinction), and voltage switching illumination (application of an alternating applied voltage);

FIG. 10 is a graph showing the life of a valve (in view of deformation of a filament) having arisen through continuous illumination, simple blinking, blinking [dimming performed at the time of extinction (dimming times of 2 seconds, 1 second, and 0.5 seconds)], blinking (as in the embodiment in which light is dimmed to a threshold value at the time of extinction), and voltage switching illumination;

FIG. 11A is a view showing a voltage applied to the light source during simple blinking;

FIG. 11B is a view showing a voltage applied to the light source during blinking (dimming performed at the time of extinction);

FIG. 11C is a view showing a voltage applied to the light source during voltage switching illumination (application of an alternating applied voltage);

FIG. 11D is a view showing a voltage applied to the light source during blinking (dimming of light to a threshold value at the time of extinction);

FIG. 12A is a view showing points on an illuminating filament at which the radiant intensity of infrared rays is measured;

FIG. 12B is a view showing a temperature distribution (the radiant intensity of the infrared rays);

FIG. 13A is a view showing a change in the temperature of the filament (i.e., a variation in the radiant intensity of infrared rays) achieved as a result of extinction after having been subjected to simple blinking, blinking [dimming performed at the time of extinction (dimming times of 2 seconds, 1 second, 0.5 seconds, and 0.3 seconds)], and blinking (as in the embodiment in which light is dimmed to a threshold value at the time of extinction);

FIG. 13B is a view showing a change in the temperature of the filament (a change in the radiant intensity of infrared rays) achieved as a result of extinction after having been subjected to simple blinking and voltage switching illumination;

FIG. 14A is a view showing force acting on the filament during illumination; and FIG. 14B is a view showing how pitch touch is induced by the force acting on the filament during illumination.

DETAILED DESCRIPTION OF THE INVENTION

An exemplary, non-limiting embodiment of the present invention will now be described. However, the present invention is not limited thereto, and any equivalent structures and/or methods not specifically disclosed, which would be known to one of ordinary skill in the art, may also be used.

Figure 1:
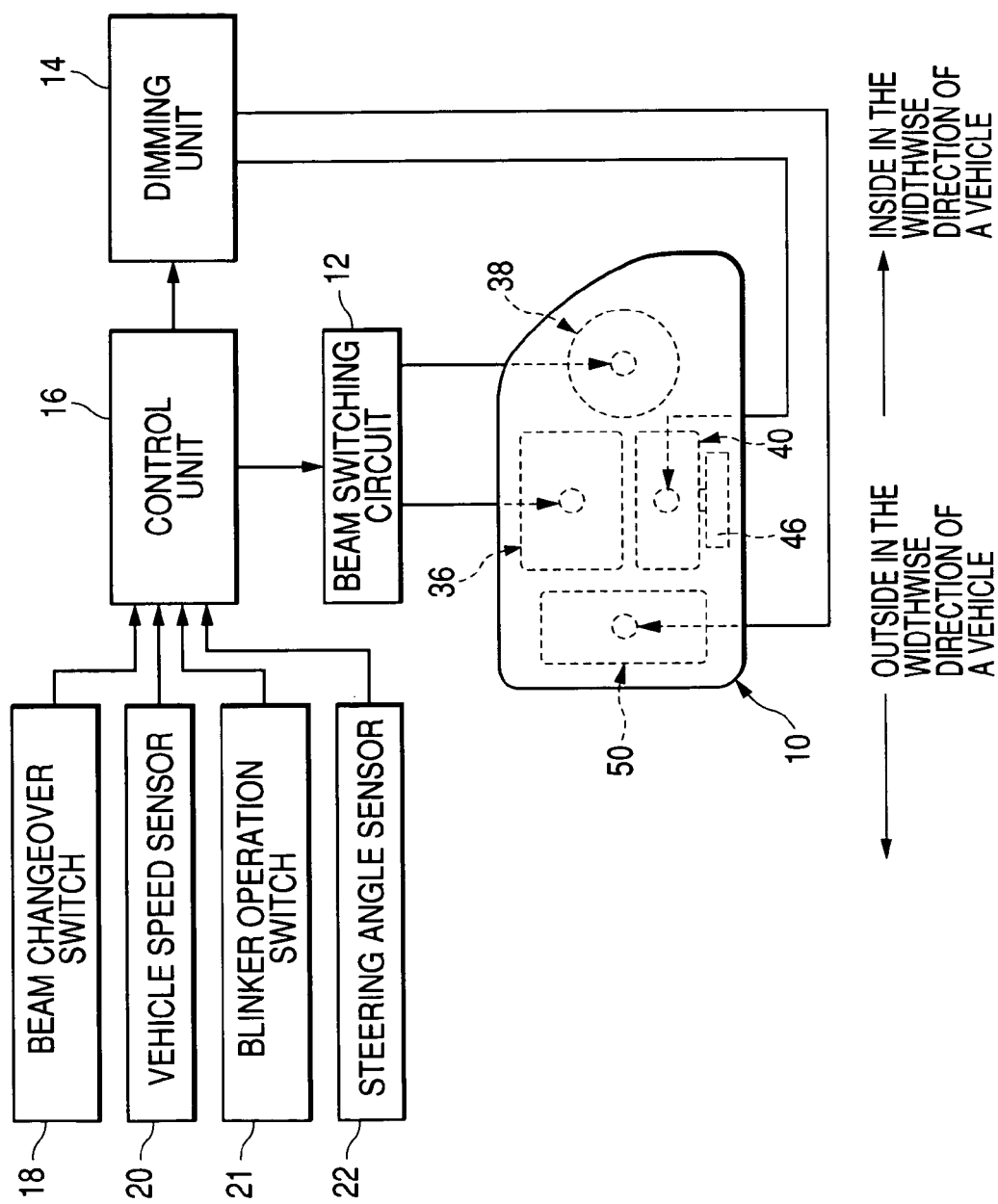
FIG. 1 is an overall block diagram of a vehicle headlamp system according to an exemplary, non-limiting embodiment of the invention.

In FIG. 1, the vehicle headlamp system comprises a head lamp 10 which is a lamp set disposed on the right side of the vehicle front end section (i.e., the right side of the vehicle when viewed from the driver); a beam switching circuit 12; a dimming unit 14; a control unit 16; a beam changeover switch 18; a vehicle speed sensor 20; a blinker operation switch 21; and a steering angle sensor 22.

The headlamp 10 constituting the lamp set is configured such that a low-beam formation lamp unit 36 and a high-beam formation lamp unit 38, both serving as main lamps, and a bend lamp unit 40 and a cornering lamp unit 50, both serving as sub-lamps (auxiliary lamp units), are housed in a lamp chamber constituted of a transparent cover 32 and a lamp body 34 and such that the optical axis (i.e., a radiating direction) of only the bend lamp unit 40 serving as a sub-lamp from among the four types of lamp units can be tilted right and left by means of an actuator 46.

Figure 2:
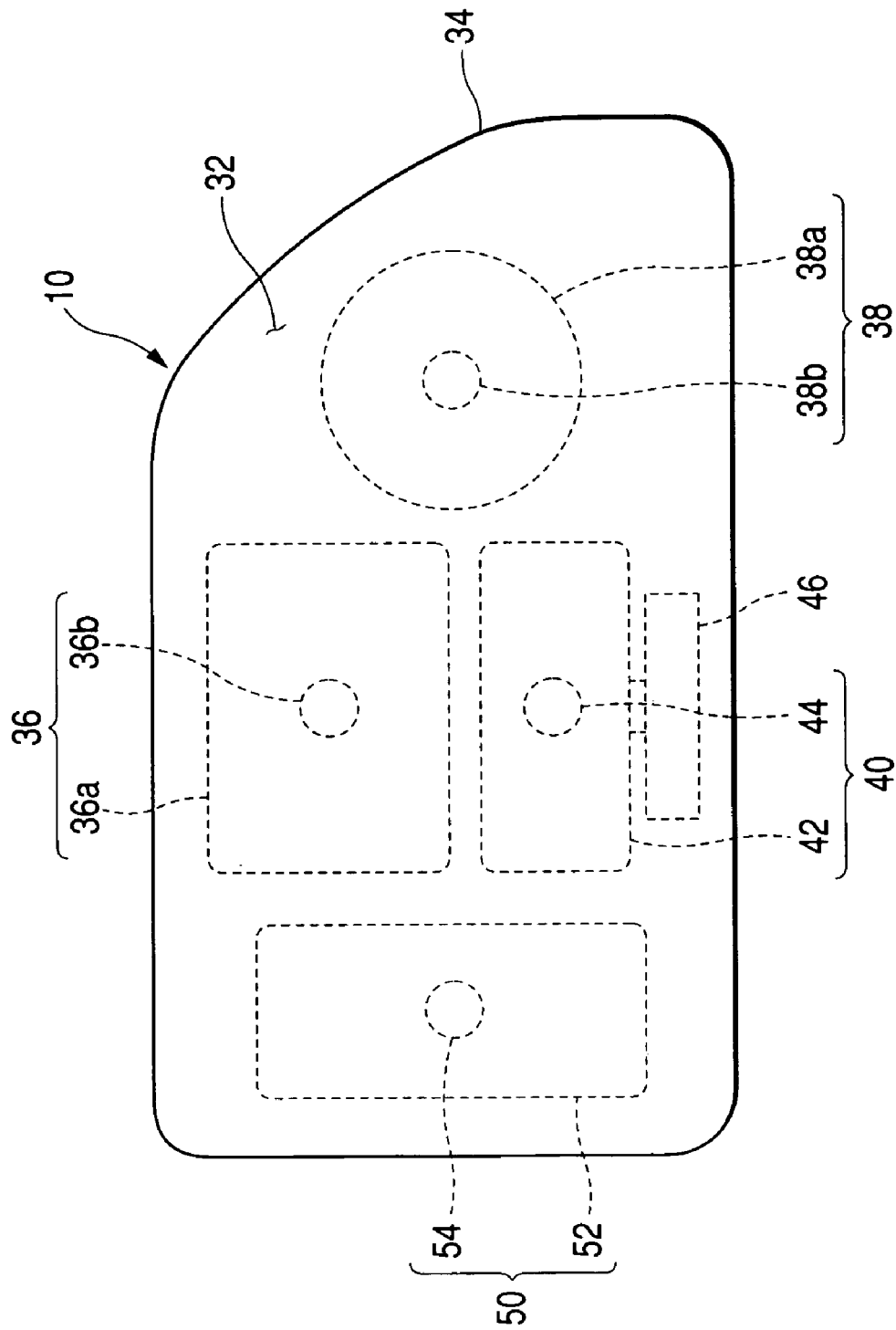
FIG. 2 is a front view of the headlamp constituting a principal feature of the system, according to an exemplary, non-limiting embodiment of the invention.
Figure 3:
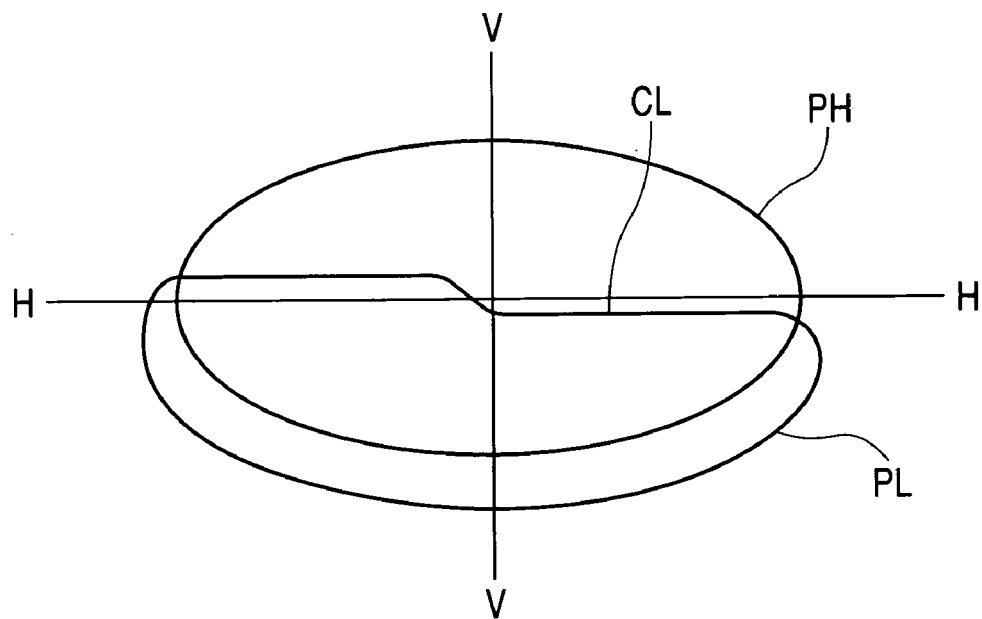
FIG. 3 is a view showing a light distribution pattern formed by a low-beam formation lamp unit and a high-beam formation lamp unit, which are main lamps housed in the headlamp according to an exemplary, non-limiting embodiment of the invention.

As shown in FIG. 2, the low-beam formation lamp unit 36 includes a reflector 36a and a halogen valve (or a metal halide valve) 36b and is used for ordinary driving as in an urban area. As indicated by reference symbol PL shown in FIG. 3, a low-beam light distribution pattern having a sharp cutoff line CL along a horizontal line H—H is formed as a result of illumination of the valve 36b.

The high-beam formation lamp unit 38 is used for enhancing the visibility of the driver at a long forward distance from the vehicle during high-speed traveling and comprises a reflector 38a and a halogen valve or metal halide valve 38b. As indicated by reference symbol PH shown in FIG. 3, a high-beam light distribution pattern—which extends up to a point above the horizontal line H—H and reaches a distant location—is formed as a result of illumination of the valve 38b.

The bend lamp unit 40 and the cornering lamp unit 50, both serving as common sub-lamps (auxiliary lamp units), include reflectors 42, 52 and halogen valves (H8 valves) 44, 54, respectively. The bend lamp unit 40 is primarily for enhancing the driver's visibility in the forward traveling direction of the vehicle during turning. In contrast, the cornering lamp unit 50 is primarily for enhancing the driver's visibility in the forward, sideways direction of the vehicle. Thus, the lamp units 40 and 50 are functionally different from each other and hence yield a difference, in view of at least the following points.

Figure 4:
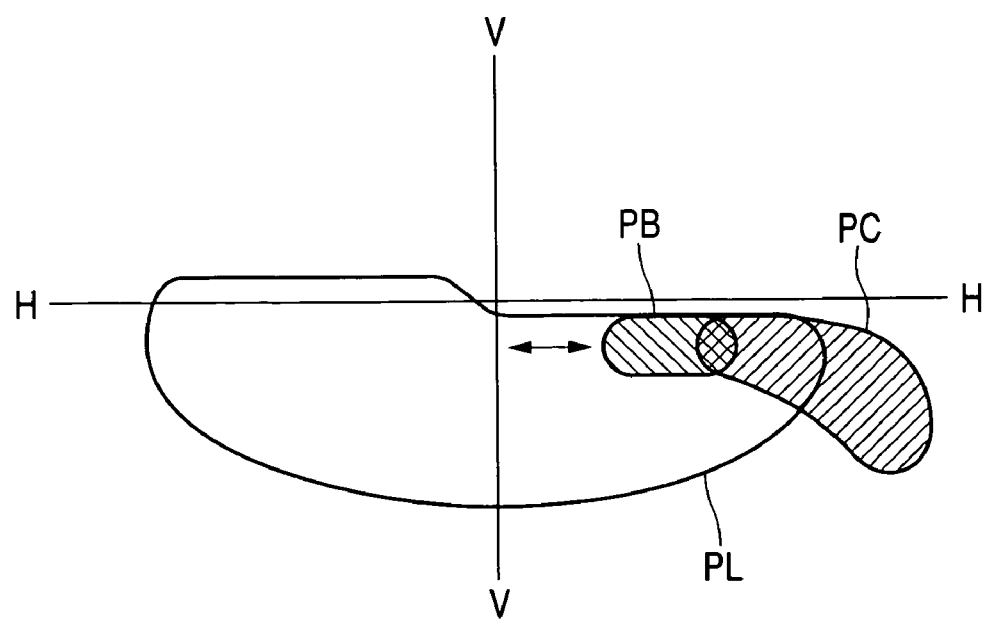
FIG. 4 is a view showing a light distribution pattern radiated ahead of the vehicle from the headlamp when the vehicle turns right according to an exemplary, non-limiting embodiment of the invention.

The bend lamp unit 40 is used in a medium-speed or high-speed range when the vehicle changes a lane, travels along a mountain trail, or turns a gentle corner. As indicated by reference symbol PB shown in FIG. 4, the bend lamp unit 40 forms a light distribution pattern which illuminates an area located in the vicinity of the clear cut line CL of the low-beam light distribution pattern PL in the vertical direction and a comparatively narrow area corresponding to the line of the, driver's vision in the horizontal direction. The headlamp 10 is a right-side headlamp disposed at the right-side front end of the vehicle (i.e., on the right side when viewed by the driver).

Accordingly, the bend lamp unit 40 is configured so that the optical axis (radiating direction) of the bend lamp unit 40 can be swiveled horizontally within a right half of the range of the low-beam light distribution pattern PL (see the arrow shown in FIG. 4) by the driving action of the lower actuator 46 and swiveled in conjunction with the extent to which the steering wheel is steered. The bend lamp unit 40 is automatically illuminated and extinguished by means of steering action of the steering wheel. At the time of extinction, the bend lamp unit 40 is dimmed such that the amount of light is gradually decreased.

The cornering lamp unit 50 is used when the vehicle travels through an intersection or a sharp corner at a low speed. In contrast with the foregoing bend lamp unit 40, the optical axis of the cornering lamp unit 50 is fixed. As indicated by reference symbol PC shown in FIG. 4, the cornering lamp unit 50 forms a light distribution pattern which illuminates a comparatively-wide area on the front right side of the vehicle that cannot be illuminated with the low-beam light distribution pattern PL. The cornering lamp unit 50 is automatically illuminated and extinguished in accordance with activation of a blinker or steering action of the steering wheel. At the time of extinction, the cornering lamp unit 50 is dimmed such that the quantity of light is gradually decreased.

In FIG. 1, the beam changeover switch 18 is for manually, selectively switching between the low-beam light distribution pattern and the high-beam light distribution pattern. The control unit 16 receives a beam switching signal output from the beam changeover switch 18; a vehicle speed signal detected by the vehicle speed sensor 20; a signal of the blinker operation switch 21; and a steering angle signal detected by the steering angle sensor 22.

Upon receipt of the beam switching signal output from the beam changeover switch 18, the control unit 16 delivers an output to the beam switching circuit 12. The beam switching circuit 12 switches between a beam of the lamp unit 36 and a beam of the lamp unit 38, whereupon the low-beam light distribution pattern PL and the high-beam-light distribution pattern PH are switched.

In accordance with the vehicle speed signal output from the vehicle speed sensor 20, the signal of the blinker operation switch 21, and the signal of the steering angle sensor 22, the control unit 16 activates the dimming unit 14, thereby controlling illumination/extinction of the bend lamp unit 40 and the cornering lamp unit 50, both serving as sub-lamps (auxiliary lamp units). Specifically, in accordance with the dimming control signal output from the control unit 16, the dimming unit 14 causes the bend lamp unit 40 or the cornering lamp unit 50 to illuminate and controls the quantity of light radiated from the respective lamp units 40, 50 at the time of extinction, by variably controlling the power supplied to the valves 44, 54 (i.e., applied voltages) through PWM (pulse width modulation).

Figure 5A:
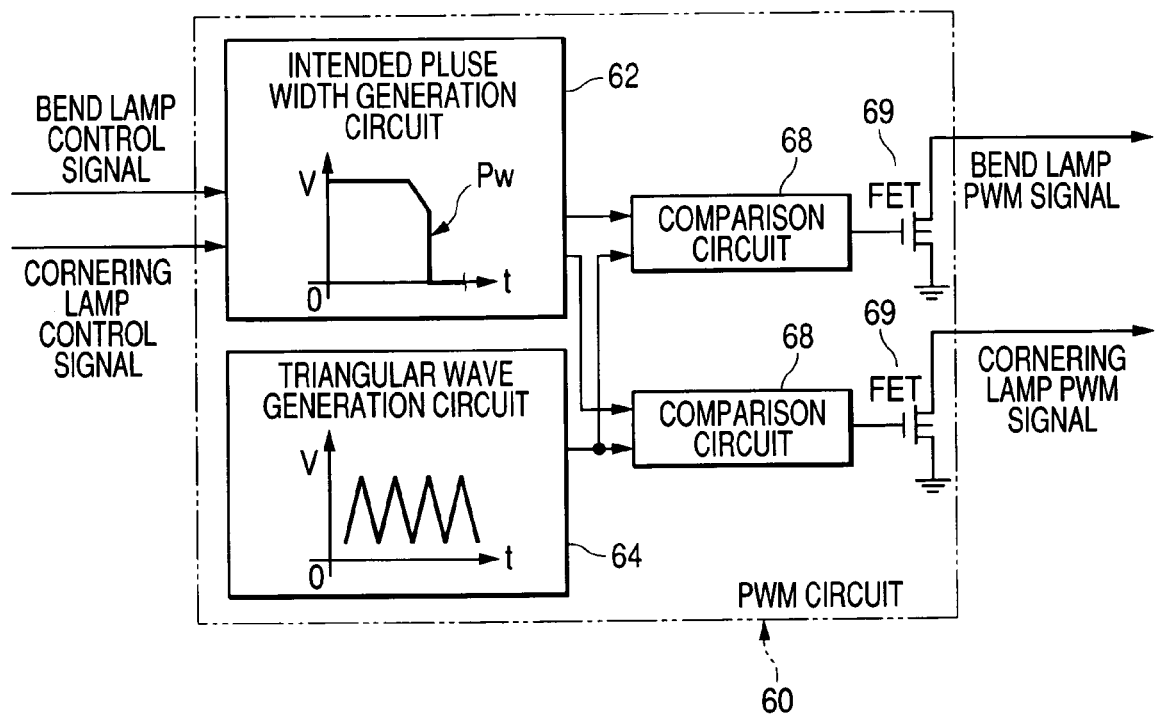
FIG. 5A is a block diagram showing the configuration of a PWM circuit according to an exemplary, non-limiting embodiment of the invention.
Figure 5B:
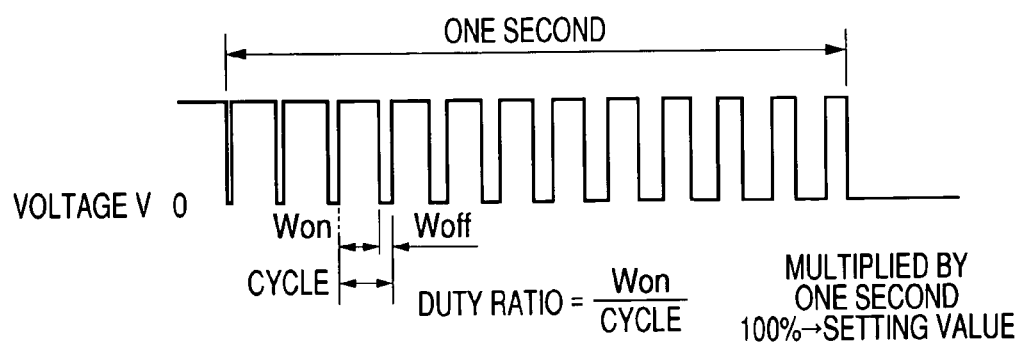
FIG. 5B is a view showing a dimming control signal (PWM signal) output from the PWM circuit constituting a dimming unit according to an exemplary, non-limiting embodiment of the invention.
Figure 6:
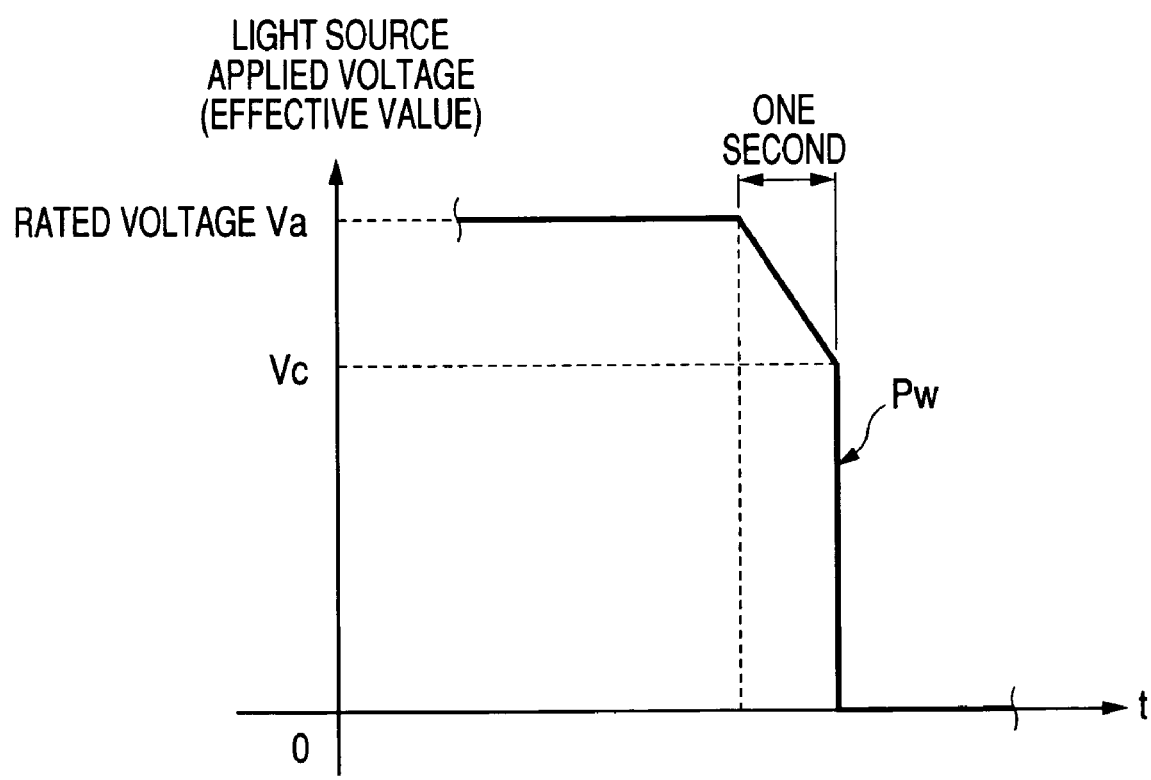
FIG. 6 is a view showing a light source applied voltage control pattern achieved at the time of extinction of the auxiliary lamp unit according to an exemplary, non-limiting embodiment of the invention.

As shown in FIG. 5A, the dimming unit 14 includes a comparison circuit 68 for comparing a signal wave of an intended pulse width generation circuit 62 with a reference voltage of a triangular wave generation circuit 64; and a PWM circuit 60 including a switching transistor 69 activated by the comparison circuit 68. As shown in FIG. 5B, in accordance with an instruction from the control unit 16, the dimming unit 14 outputs a PWM signal modulated such that the pulse width gradually becomes smaller, thereby controlling extinction of the bend lamp unit 40 or the cornering lamp unit 50. Particularly, when the bend lamp unit 40 or the cornering lamp unit 50 is to be extinguished, as shown in FIG. 6, the effective value of the light source applied voltage (hereinafter called a "light source applied voltage") declines linearly from a rated value Va to 3a threshold value Vc. Subsequently, the light source applied voltage is controlled to assume a value of 0 in one stroke.

For example, but not by way of limitation, when having perceived that a steering angle of the steering handle has assumed an angle of about 50° or more or that the blinker has been activated with the vehicle traveling at a low speed of about 0 to 30 Km/h, the control unit 16 outputs to the dimming unit 14 a control signal for causing the cornering lamp unit 50 to illuminate. Having received the control signal from the control unit 16, the dimming unit 14 applies a rated voltage of 12 volts to the valve 54 of the cornering lamp unit 50, whereupon the cornering lamp unit 50 automatically illuminates.

In contrast, when having perceived that the steering angle of the steering wheel has assumed an angle of about 5° or more with the vehicle traveling at an intermediate or high speed of about 30 to 60 Km/h, the control unit 16 outputs to the dimming unit 14 a control signal for causing the bend lamp unit 40 to illuminate. Having received the control signal from the control unit 16, the dimming unit 14 applies a rated voltage of 12 volts to the valve 44 of the bend lamp unit 40, whereupon the bend lamp unit 40 is automatically illuminated.

When having perceived that the steering angle of the steering wheel has assumed an angle less than about 5°, the control unit 16 outputs an extinction control signal to the dimming unit 14. As a result, as shown in FIG. 6, the dimming unit 14 controls the voltages applied to the valves 44, 54 to 0in one stroke after having gradually (linearly) decreased the voltages applied to the respective valves 44, 54 to a, preset threshold value Vc over a period of one second. Specifically, upon receipt of various information items required to control illumination of lamps from the vehicle, the control unit 16 outputs, to the dimming unit 14, a signal for illuminating/extinguishing the bend lamp unit 40 or the cornering lamp unit 50 in accordance with the driving conditions. Having received the extinction control signal, the dimming unit 14 controls the power supplied to the valves 44, 54 (i.e., applied voltages) by a predetermined signal waveform such as that shown in FIG. 5B through PWM (pulse width modulation), thereby controlling the quantity of light radiated at the time of extinction of the lamp units 40, 50 through dimming operation.

Therefore, the bend lamp unit 40 and the cornering lamp unit 50 do not shift from the ordinary illuminated state to the extinguished state in one stroke, but shift to extinction when the quantity of light radiated from the respective lamp units has gradually decreased to the quantity of light corresponding to the light source applied voltage Vc. Substantially no sharp change arises in the quantity of light radiated from the bend lamp unit 40 and the cornering lamp unit 50, and substantially no uncertainty is posed to the driver of interest, passengers and drivers of oncoming vehicles, or pedestrians.

The threshold value Vc in the "light source applied voltage control pattern for extinction" Pw input and set in the control unit 16 is set to about nine volts, which has been ascertained to be optimal for the H8 valve by experiment.

Specifically, the H8 valve (having rated power of 12 volts and 35 watts) was subjected to the continuous illumination test, the blinking test (simple blinking test and dimming at the time of extinction), and the voltage switching illumination test (see FIGS. 9 and 10). Through the tests, it was determined that although a definite transition point (transition temperature) could not originally exist for a tungsten filament, a transition point (transition temperature) of the tungsten filament exists around a temperature corresponding to a light source applied voltage of 8 volts (i.e., the temperature of the filament achieved when a voltage of 8 volts is applied to a valve), and that the transition point (transition temperature) is gradually passed during the course of the filament being gradually cooled during dimming control operation by gradually decreasing the light source applied voltage, whereupon the filament is affected by the annealing operation achieved at the transition point (transition temperature). More specifically, every control operation for shifting the valve to an extinguished state by gradually decreasing the amount of power fed to the valve remaining in an illuminated state (i.e., the light source applied voltage), the tungsten filament is gradually cooled from a high temperature beyond the transition point (transition temperature).

Every time the filament is cooled, the transition point (transition temperature) unique to tungsten is slowly passed, and the filament undergoes action resembling "annealing." As a result of passage over the transition point (transition temperature) while tungsten is being annealed in accordance with dimming control operation being repeated, the crystalline structure of tungsten is changed to a "structure which is likely to be deformed by stress" as achieved when the structure of tungsten has been "annealed."

Consequently, the filament becomes deformed by the electromagnetic force or thermal stress developing in the filament at the time of illumination of the valve. The transition point (transition temperature) determined by experiment corresponds to a light source applied voltage of about 8 volts. A value slightly higher than the thus-determined light source applied voltage of about 8 volts should be set as a "threshold value" (a descending lower limit of a light source applied voltage set such that the metallographic structure of filament does not shift to the transition point (transition temperature) when the light source applied voltage is gradually decreased from the rated voltage). However, in consideration of safety for uncertainty which would arise at the time of final extinction and for required life of the valve, in the present embodiment the threshold value is set to 9 volts. However, the threshold value is not limited thereto.

As mentioned above, according to the extinction dimming control for gradually decreasing the light source applied voltage from the rated power (rated voltage) to zero volt, the filament becomes deformed when being inevitably affected by the annealing achieved at the transition point (transition temperature), thereby shortening the life of the valve. In the present embodiment, at the time of extinction dimming control of the bend lamp unit 40 and the cornering lamp unit 50 (extinction dimming control of the valves 44, 54), the light source applied voltage is gradually decreased to a threshold value (about 9 volts). Once the threshold value has been achieved, the light source applied voltage is reduced to 0 in a stroke.

Therefore, during extinction dimming control of the lamp units 40, 50, the lamp units 40, 50 are subjected to dimming control such that the quantity of light is gradually decreased by means of gradually decreasing the applied voltages over a period of one second until the lamp units shift from the illuminated state—in which rated power (i.e., a rated voltage) is applied to the lamp units—to the threshold value (about 9 volts). However, the temperatures of the filaments of the valves 44, 54 do not reach the transition point (transition temperature). Hence, the filament will not be affected by the annealing achieved at the transition point (transition temperature). Therefore, the crystalline structure filament does not change to a structure which is easily deformed by stress.

When the light source applied voltage has reached the threshold value (about 9 volts), the voltage applied to the light sources is controlled such that the voltage falls to zero substantially instantaneously. The filaments of the valves 44, 54 pass the transition point (transition temperature) while being rapidly cooled from a temperature higher than the transition point (transition temperature) to a low temperature falling outside the transition point (transition temperature). Therefore, during this period, the filaments are not affected by annealing achieved at the transition point (transition temperature). Specifically, the crystalline structure of the filament does not change to a structure which is easily deformed by stress.

As shown in FIGS. 9 and 10, a mean life of 486.6 hours (a maximum life of 638.5 hours and a minimum life of 393.3 hours) that bears comparison with a mean life of 470.1 hours yielded by the simple blinking test was ascertained to have been yielded by the blinking (dimming at the time of extinction) test performed on the valve 44 (54). Therefore, according to the present embodiment, shortening of the life of valves 44, 54 of the lamp units 40, 50 which are subjected to extinction dimming control is prevented (i.e., the longevity of the valves was achieved).

In the foregoing embodiment, 9 volts is set as the "threshold value" at which no change arises in the crystalline structures of the filaments of the halogen valves (H8 valves) 44, 54. However, another arbitrary value (e.g., 8.5 volts) which is closer to a voltage of about 8 volts; that is, the light source applied voltage corresponding to the transition point (transition temperature) determined by experiment, may also be set as the "threshold value." When the value closer to the transition point is set as the "threshold value," the quantity of light radiated from the lamp units 40, 50 immediately before extinction is further diminished, and hence uncertainty which would arise when the lamp units shift to an extinguished state can be lessened to a much greater extent.

Figure 7:
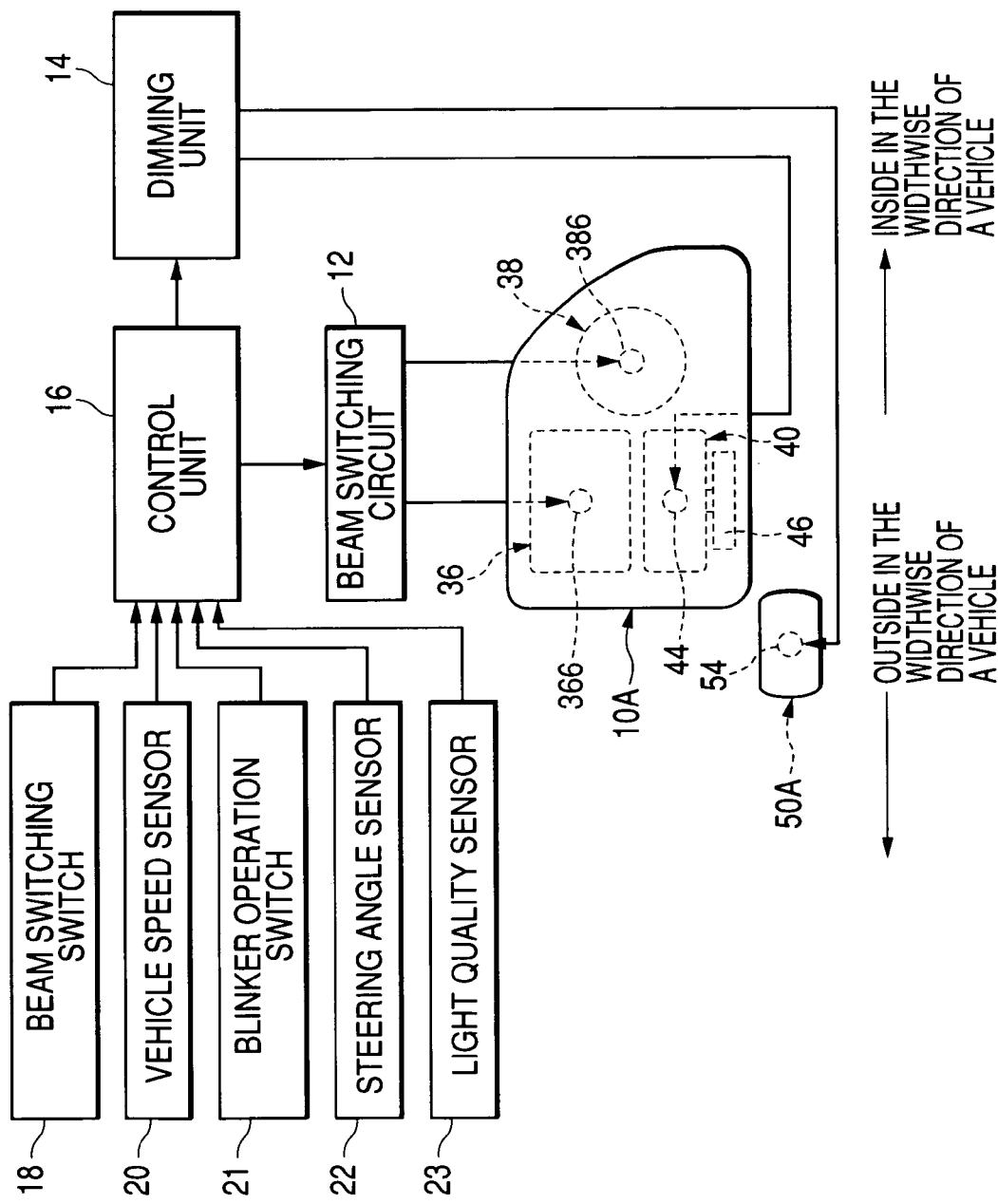
FIG. 7 is an overall block diagram of a vehicle headlamp system according to a second exemplary, non-limiting embodiment of the invention.
Figure 8:
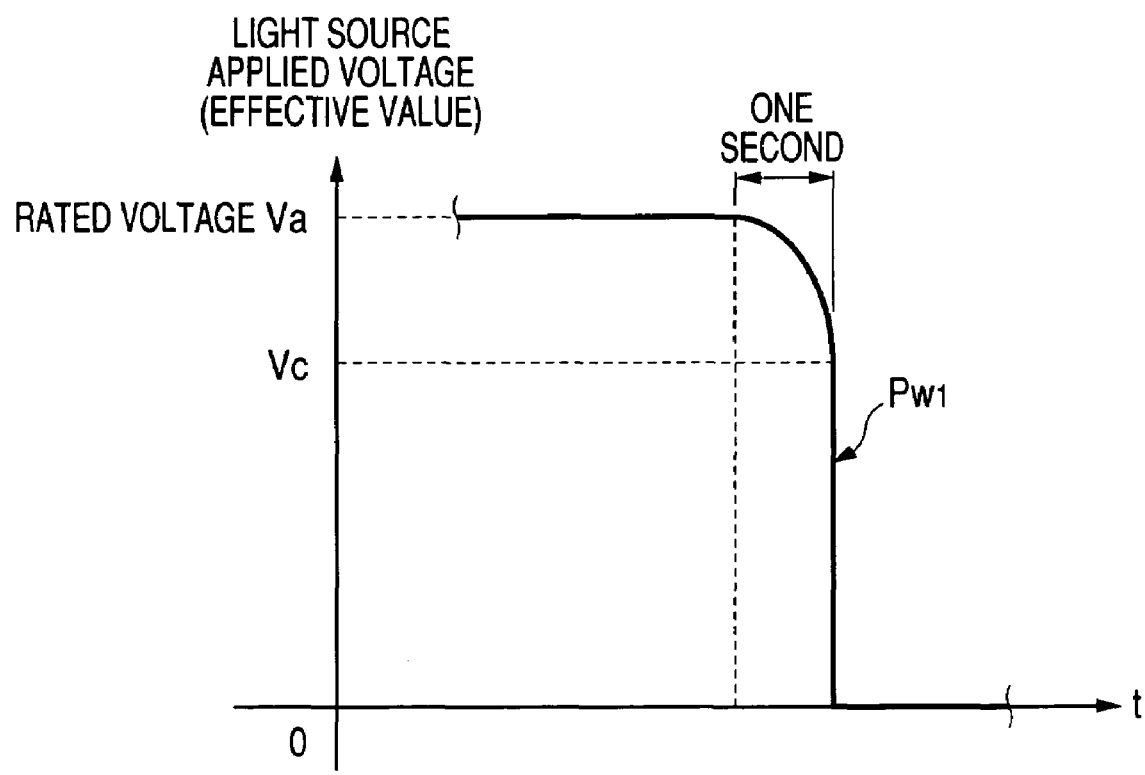
FIG. 8 is a view showing a light source applied voltage control pattern achieved at the time of extinction of an auxiliary lamp unit serving as the principal feature of the system according to an exemplary, non-limiting embodiment of the invention.

FIGS. 7 and 8 show a vehicle headlamp system according to a second exemplary, non-limiting embodiment of the invention. FIG. 7 is an overall block diagram of the vehicle head lamp system; and FIG. 8 is a view showing a light source applied voltage control pattern obtained at the time of extinction of auxiliary lamp units that serve as the principal features of the system.

In the front headlamp 10 described in connection with the first exemplary, non-limiting embodiment, the bend lamp unit 40 and the cornering lamp unit 50, which act as auxiliary lamp units, are housed in the lamp chamber along with the low-beam formation lamp unit 36 and the high-beam formation lamp unit 38, which act as the main lamps. Only the bend lamp unit 40 is housed in a lamp chamber of a headlamp 10A of the second exemplary, non-limiting embodiment along. With the low-beam formation lamp unit 36 and the high-beam formation lamp unit 38, which act as the main lamps. A cornering lamp unit 50A serving as an auxiliary lamp is integrated with part of the vehicle, e.g., a front bumper, and disposed in close proximity to the headlamp 10A.

In addition to having the configuration of the first embodiment, the headlamp system is configured such that a light quantity sensor (environment illumination detection sensor) 23 is mounted on the upper surface of the dash board facing the windshield. In accordance with a signal output from the light quantity sensor 23, the valve 36b of the sub-beam formation lamp unit 36 of the headlamp is automatically illuminated or extinguished. The headlamp system is also configured so as to illuminate or extinguish the lamp units 40, 50A through use of a signal output from the light quantity sensor 23.

Specifically, the control unit 16 is configured to receive an output from the light quantity sensor 23. When the output from the light quantity sensor 23 is higher than a value (i.e., when the environment illumination is higher than the value), the environment is sufficiently bright. When the headlamp sub-beam formation lamp unit 36 is being illuminated, the lamp unit is extinguished. In contrast, when the output from the light quantity sensor 23 has come to a value or less (i.e., when the environment illumination has dropped to the value or less) during the course of illumination of the sub-beam formation lamp unit 36, the driver's environment is considered to be dark, and hence the control unit 16 is operated (like a known automatic writing system) so as to illuminate the sub-beam formation lamp unit 36.

When the output from the light quantity sensor 23 has reached or exceeded a value (i.e., at least the environment illumination of the value), the quantity of light radiated ahead of the vehicle does not need to be increased. Therefore, even when switching operation is performed for illuminating the lamp units 40, 50A (e.g., input of a signal from the blinker operation switch 21 or a signal from the steering angle sensor 22), the lamp units 40, 50A are not illuminated. When the output from the light quantity sensor 23 has attained at least a value during the course of illumination of the lamp units 40, 50A, the lamp units 40, 50A are extinguished immediately. Therefore, the lamp units 40, 50A are illuminated only when the driver experiences inconvenience during driving, and remain unilluminated (i.e., extinguished) when no light is required. Therefore, wasteful consumption of power is avoided.

As shown in FIG. 6, in the first exemplary, non-limiting embodiment, the light source applied voltage control pattern Pw achieved at the time of extinction is configured such that the light source applied voltage decreases linearly from the rated voltage Va to the "threshold value" Vc. As shown in FIG. 8, in the exemplary, non-limiting second embodiment, the light source applied voltage is configured to decrease to trace the locus of an upwardly-convex-shaped continuous hyperbola from the rated voltage Va to the "threshold value" Vc over a period of one second. Uncertainty which would arise after the "threshold value" has reached 0 volts is reduced.

In other respects, the second exemplary, non-limiting embodiment is identical with the first embodiment, and hence repeated explanations thereof are omitted, and like reference numerals are assigned to like features.

In the first and second embodiments, dimming control is performed such that the quantity of light is diminished over a period of about one second. However, the duration of time is not limited to one second. An arbitrary time may be set, so long as the time falls within the range of one second to two seconds.

The embodiments have described dimming control of the H8 valves. Even when the light sources of the bend lamp unit 40 and those of the cornering lamp unit 50 are constituted of other halogen valves having single filaments made of tungsten, such as an H7 valve, an H11 valve, an HB3 valve, or an HB4 valve, the "threshold value" at which no change arises in the crystalline structure of the filament can be set by the same technique.

As is evident from the foregoing descriptions, according to the vehicle headlamp of the present invention, the lamp unit to be subjected to extinction dimming control (the lamp unit and/or auxiliary lamp) is extinguished after having been adjusted such that the quantity of light is gradually decreased from a normal illuminated state. Therefore, the quantity of light does not change abruptly, and hence no uncertainty is posed on the driver of interest, passengers and drivers of oncoming vehicles, and pedestrians.

The present invention has various advantages. For example, but not by way of limitation, at the time of extinction of the lamp unit (the lamp unit and/or auxiliary lamp), there is performed dimming control which gradually decreases voltages applied to the light sources of the lamp unit. However, in the "area beyond the threshold value," the filaments may be affected by a change in the crystalline structure due to annealing, the light source applied voltages drop to 0 volt immediately, and the filaments serving as illuminants are rapidly cooled and shifted to a low temperature outside the transition point (transition temperature) after having passed through the transition point (transition temperature). Hence, the filaments are not affected by a change in the crystalline structure due to annealing. Therefore, there is prevented a shortening in the life of a valve, which would otherwise be caused by deformation of the filaments.

Further, the quantity of light of the lamp unit gradually decreases over an appropriate period (about one to two seconds). Therefore, the quantity of light corresponding to the driving conditions is achieved smoothly, and the driver's driving operation becomes easy. Thus, there is achieved illumination control which does not pose any uncertainty to the driver of interest, passengers and drivers of oncoming vehicles, and pedestrians, thereby ensuring safe driving.

Also, as a result of setting of an optimal threshold value corresponding to the kind of a valve within the range of light source applied voltage of about 7 to 9 volts, the headlamp can be subjected to light control without affording uncertainty to the driver of interest, passengers and drivers of oncoming vehicles, and pedestrians. Hence, there is prevented shortening of the life of the valve, which would otherwise be caused by deformation of a filament.

Additionally, after the light source applied voltage has been lowered along the locus of an upwardly convex-shaped hyperbola through PWM, the light is extinguished. Hence, uncertainty that would arise at the time of extinction in the related art does not arise.

Also, the lamp unit and/or auxiliary lamp is illuminated and extinguished in accordance with the driving conditions and the environment illumination. Therefore, wasteful consumption of power is diminished, thereby saving power.

Particularly, when an automatic lighting system for automatically controlling illumination and extinction of the headlamp sub-beam formation lamp unit is provided, illumination and extinction of the lamp unit and/or the auxiliary lamp are controlled through use of a signal output from a light quantity sensor (an environment illumination detection sensor) constituting the automatic lighting system, as a result of which the configuration of the headlamp system is simplified.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

We claim:

1. A vehicle headlamp system including a headlamp and configured to control illumination of lamp units in accordance with a driving condition, the headlamp comprising lamp units housed in a lamp chamber defined by a lamp body, and a front lens, and to emit a beam ahead of said vehicle in a light distribution pattern, the system comprising:
   a dimming unit that controls said illumination by adjusting an amount of power fed to a light source of at least one of the lamp units to adjust the quantity of light radiated from said lamp unit, wherein
   said dimming unit gradually decreases an effective value of a light source applied voltage to extinguish said lamp unit, and sets said effective value of said light source applied voltage to zero in one stroke when said effective value of said applied voltage has decreased to a threshold value, and wherein
   said dimming control decreases said effective value of the voltage applied to said light source to the threshold value over a predetermined period of time.

2. The vehicle headlamp system according to claim 1, wherein the predetermined period of time is about one to two seconds.

3. The vehicle headlamp system according to claim 1, wherein said threshold value of said effective value of said light source applied voltage is a value within a range of about 7 volts to 9 volts.

4. The vehicle headlamp system according to claim 1, wherein dimming control performed by said dimming unit at the time of extinction is configured to lower said effective value of said light source applied voltage to the threshold value along a locus of an upwardly-convex-shaped continuous hyperbola.

5. The vehicle headlamp system according to claim 1, wherein at least one of said lamp units subjected to said dimming control operation are configured to be illuminated and extinguished based on a switching operation;
   wherein, when illumination of an environment is at least a value or more, power is not fed to said light source of said one of said lamp units when said switching operation is performed; and
   wherein, when illumination of said environment is at least said value or more during illumination of said at least one of said lamp units, said effective value of said voltage applied to said light source of said at least one of lamp units is set to zero in one stroke.

6. The system of claim 1, wherein said threshold value of said effective value of said light source applied voltage is one of about 8.5 volts and about 9.0 volts.

7. The system of claim 1, wherein said driving condition is based on an input received from at least one of a vehicle speed sensor switch, a blinker adjustment switch, a steering angle sensor, and a beam changeover switch.

8. A vehicle headlamp system having a headlamp in which is provided at least one lamp unit and an auxiliary lamp, and configured to control illumination of one of the at least one lamp unit and said auxiliary lamp in accordance with a driving condition, the at least one lamp unit and said auxiliary lamp housed in a lamp chamber defined by a lamp body, and a front lens, and to emit a beam ahead of said vehicle in a light distribution pattern, the system comprising:

a dimming unit that controls said illumination by adjusting at least one of (a) an amount of power fed to a light source of at least one of the at least one lamp unit, and (b) an amount of power fed to a light source of said auxiliary lamp, to respectively adjust at least one of (a) a quantity of light radiated from said lamp unit and (b) a quantity of light radiated from said auxiliary lamp unit, wherein said dimming unit gradually decreases an effective value of a light source applied voltage to extinguish at least one of said lamp unit and said auxiliary lamp, and sets said effective value of said applied voltage to zero in one stroke when said effective value of said applied voltage has decreased to a threshold value, and wherein said dimming control decreases said effective value of the voltage applied to said light source to the threshold value over a predetermined period of time.

9. The vehicle headlamp system according to claim 8, wherein the predetermined period of time is about one to two seconds.

10. The vehicle headlamp system according to claim 8, wherein said threshold value of said effective value of said light source applied voltage is a value within a range of about 7 volts to 9 volts.

11. The vehicle headlamp system according to claim 8, wherein dimming control performed by said dimming unit at the time of extinction is configured to lower said effective value of said light source applied voltage to the threshold value along a locus of an upwardly-convex-shaped continuous hyperbola.

12. The vehicle headlamp system according to claim 8, wherein at least one of said lamp unit and said auxiliary lamp subjected to said dimming control operation are configured to be illuminated and extinguished based on a switching operation;

wherein, when illumination of an environment is at least a value, power is not fed to said light source of said one of said lamp unit and said auxiliary lamp when said switching operation is performed; and wherein, when illumination of said environment is at least said value or more during illumination of said at least one of said lamp unit and said auxiliary lamp, said effective value of said voltage applied to said light source of said at least one of lamp unit and said auxiliary lamp is set to zero in one stroke.

13. The system of claim 8, wherein said threshold value of said effective value of said light source applied voltage is one of about 8.5 volts and about 9.0 volts.

14. The system of claim 8, wherein said driving condition is based on an input received from at least one of a vehicle speed sensor switch, a blinker adjustment switch, a steering angle sensor, and a beam changeover switch.

15. A vehicle headlamp system configured to control illumination of one of a lamp unit and an auxiliary lamp disposed in a vicinity of said headlamp, in accordance with a driving condition and to emit a beam ahead of said vehicle in a light distribution pattern, comprising:

the headlamp including at least one lamp unit housed in a lamp chamber defined by a lamp body, and a front lens; and means for controlling said illumination by adjusting at least one of (a) power input to a light source of the lamp unit, and (b) power input to a light source of said auxiliary lamp, to respectively adjust at least one of (a) a quantity of light radiated from said lamp unit and (b) a quantity of light radiated from said auxiliary lamp unit, wherein said means for controlling gradually decreases an effective value of a light source applied voltage to extinguish said one of said lamp unit and said auxiliary lamp, and sets said effective value of said applied voltage to zero in one stroke when said effective value of said applied voltage has decreased to a threshold value, and wherein said means for controlling decreases said effective value of the voltage applied to said light source to the threshold value over a predetermined period of time.

* * * * *